Figure 1:
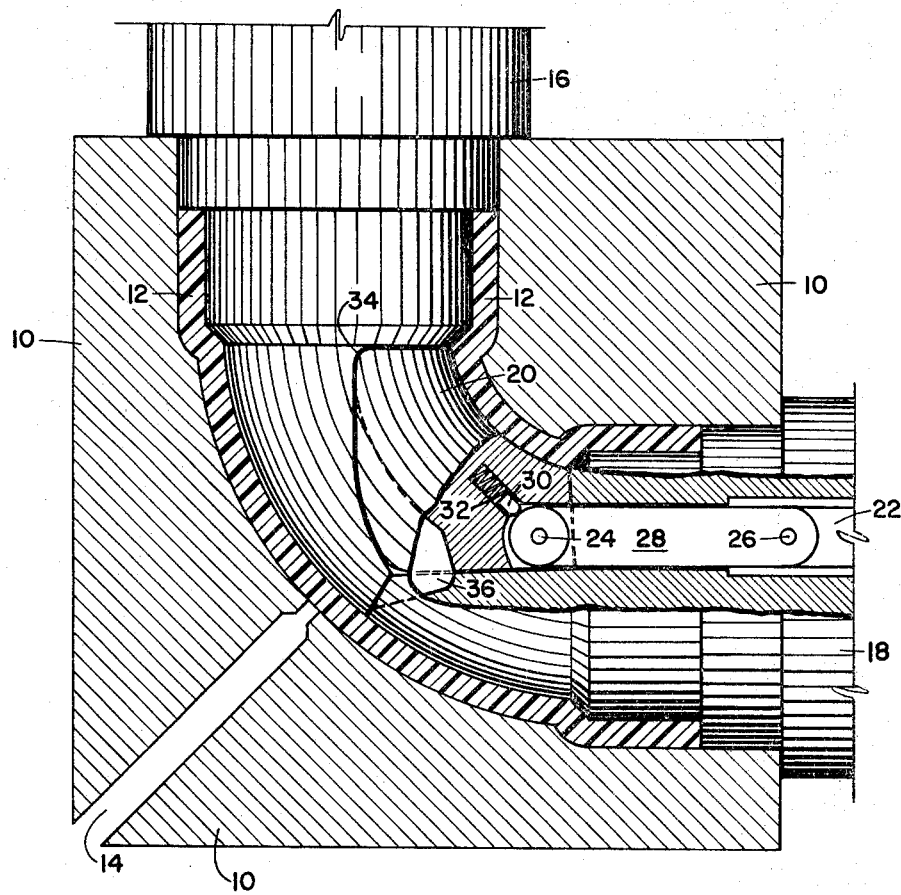

United States Patent

[11] 3,545,718

[72] Inventor Kenneth A. Shale
 Garrettsville, Ohio
[21] Appl. No. 702,466
[22] Filed Feb. 1, 1968
[45] Patented Dec. 8, 1970
[73] Assignee Continental Oil Company
 Ponca City, Oklahoma
 a corporation of Delaware

[54] REMOVABLE MOLD CORE
 3 Claims, 3 Drawing Figs.
[52] U.S. Cl. .................................................... 249/185,
 18/45
[51] Int. Cl. ....................................................... B28b 7/30
[50] Field of Search ............................................ 18/45(M),
 42(M), (undercut Digest); 249/185, 186

[56] References Cited
 UNITED STATES PATENTS
1,347,575 7/1920 Burgay .......................... 249/186
3,095,613 7/1963 Christensen et al. ......... 18/45(MX)
3,343,801 9/1967 Munger et al. ................. 249/185X
 FOREIGN PATENTS
1,237,243 6/1960 France ................18/(undercut Digest)

Primary Examiner—J. Howard Flint, Jr.
Attorneys—Joseph C. Kotarski, Henry H. Huth, Jerry B. Peterson, William A. Mikesell, Jr. and Carroll Palmer ABSTRACT: An improved segmented mold core for forming hollow curved articles, comprising two reciprocal and only one articulated segment per radius; the articulated segment is retained in position by a friction device. In a preferred embodiment, segments are maintained in alinement by a tongue-and-groove arrangement.

INVENTOR.
KENNETH A. SHALE

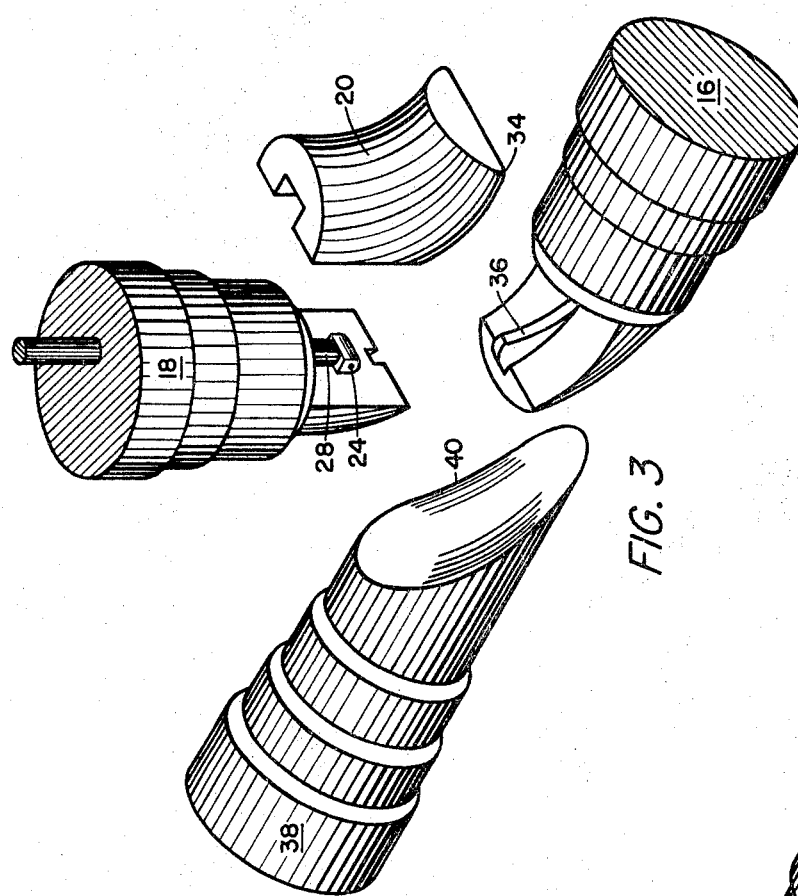
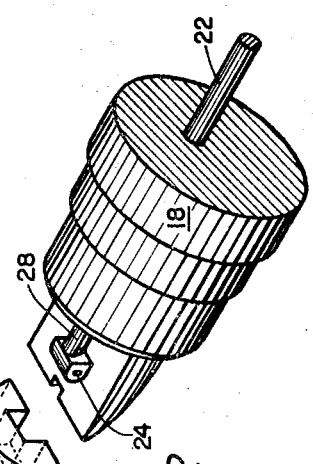
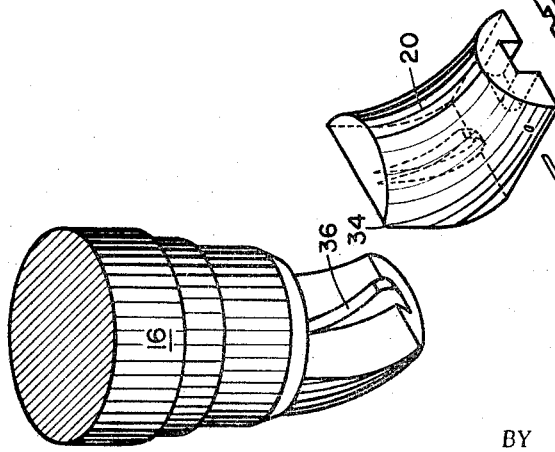
INVENTOR.
KENNETH A. SHALE

REMOVABLE MOLD CORE

This invention relates to a segmented mold core assembly adapted for injection molding of bent plastic articles, the assembly being characterized by having its outer surface formed from only three segments for each curve, two of the segments being moveable tangentially with respect to the curve, and the third being articulated with respect to one of the two. According to one aspect, the articulated segment is maintained in molding position by a friction device. According to another aspect, the segments are maintained in an alined position by a tongue-and-groove arrangement.

It is known in the art that internally-curved objects, such as pipe fitting elbows and tees, can be injection molded by use of a segmented internal core which is suitable for machine manipulation, as opposed to hand placing of such cores into position. One such internal core device is shown by U.S. Pat. 3,095,613, to Christensen et al., issued July 2, 1963. It is also known that it is desirable to minimize the number of segments which comprise such a mold core assembly, both because of core fabrication costs and because each joint between segments will inevitably cause an imperfection on the surface of the molded object.

It is accordingly an object of the present invention to provide an automatic segmented mold core assembly, for molding internally-curved objects, which exhibit a surface composed of a minimum number of segments. It is another object of the invention to provide improved means of alining and maintaining such segments in molding position.

Other aspects, objects, and the several advantages of this invention will become apparent upon study of this disclosure, the appended claims, and the drawing, in which:

FIG. 1 comprises a sectional elevation of one embodiment of this invention,

FIG. 2 comprises an oblique view of the core segments of the device of FIG. 1, and FIG. 3 comprises an oblique view of the core segments according to another embodiment of the invention.

Further understanding of the invention will be gained by reference to the drawing. In FIGS. 1 and 2 are shown an embodiment of the invention adapted for injection molding of elbow fittings. Although the fitting shown therein is a 90° elbow, it will be obvious to one skilled in the art that the invention is equally adaptable to other angles, e.g. 30° and 45° elbows. FIG. 3 illustrates a variation of the invention suitable for molding tee fittings.

Referring first to FIGS. 1 and 2, there is shown schematically a mold die 10 which is shaped to contain a cavity conforming to the outer surface configuration of the fitting 12 which is to be molded. As is known in the art, molten thermoplastic is supplied to this cavity by a sprue 14. The inner surface of the fitting is shaped by the segmented core assembly of this invention, which comprise three segments, 16, 18 and 20. Segments 16 and 18 are each moveable reciprocally along lines normal to the openings in the ends of fitting 12. Such movements are effected by hydraulic cylinders or equivalent, as is known in the art. Segment 20 is moveable out of the cavity reciprocally in the same direction as segment 18, but it is additionally articulated or pivoted on its operating rod 22. According to a preferred embodiment of the invention, this segment is pivoted to reciprocable operating rod 22 at two places, points 24 and 26, which are located on extension 28 of rod 22. Extension 28 extends through segment 18 in a hole 30, which is of close tolerance fit to extension 28. There is also preferably provided in segment 20 a friction device, such as a 'bullet' or ball 30 which is urged into frictional engagement with extension 28 by a spring 32. Segment 20 is also preferably shaped with a rounded corner 34, for a purpose which will be explained later. In another preferred embodiment of the invention, one of the segments, here 16, is provided with a tongue 36, which engages corresponding grooves in the other two segments, here 18 and 20.

An operating cycle of the device of FIGS. 1 and 2 will now be described. Assume first that all segments 16, 18 and 20 are in position within the mold cavity, in the relationship shown in FIG. 1. Molten plastic is injected into the cavity, which is of the configuration of elbow 12, by way of sprue 14. After a time interval effective to cool the plastic material, which can be aided by coolant passages in the dies and cores, not shown, the core segments are disassembled. This is accomplished by first retracting axially the segment 18, while holding segments 16 and 20 in position. Next, segment 20 is retracted by its operating rod 22. Linkage 28 is free to drop, by virtue of having retracted segment 18, and segment 20 will thus pivot around points 24 and 26 as it is withdrawn. Lastly, segment 16 is retracted axially. Die 10 and its mating die are then opened, and the molded object is discharged. It can readily be seen that all operations herein described are amenable to automatic control, as by a time cycle. The mold is readied for another molding operation by reversing the die and core disassembly steps just described. Noteworthy in this regard are the rounded end 34 of segment 20, which aids in positioning that segment as it is advanced with respect to segment 16, and friction means 30 and 32, which serves to hold segment 20 in proper relation to linkage 28. Also, tongue 36, in cooperation with the corresponding grooves, serves to aline the three segments in their proper position upon reassembly.

Reference is now made to the device of FIG. 3, which comprises a core assembly adapted to mold a tee fitting. This assembly and its operation are quite similar to that of FIG. 2, the difference residing in further provision of core assembly segment 38. As before, segments 16 and 18 are moveable reciprocally along lines normal to the openings in the cavity, as is additional segment 38. Face 40 of segment 38 is shaped to conform to the outer 'elbow' surface of the two segments 16 and 18 when they are in a contiguous position. The operation of this device is like that of the device of FIGS. 1 and 2, with the additional step of withdrawing segment 38 during disassembly of the core, which can be effected either prior to, subsequent to, or simultaneously with withdrawal of segments 18 and 20.

Although this invention has been described with respect to particular embodiments thereof, it is not to be so limited, as changes and modifications may be made therein which are within the spirit and scope of the invention as defined by the appended claims.

I claim:

1. A segmented mold core assembly adapted to form a curved inner surface in a molded object, which assembly comprises:
   a. two reciprocable inner mold core segments, each of which is reciprocable along a line tangential to a different end of the axis of said curved inner surface;
   b. a single extractable additional segmental core part associated with one of said segments and pivotal at least two axes which are disposed along and perpendicular to said tangential line associated with said one of said segments;
   c. the combination of said two segments and said single core part having an exterior surface, when abutting during molding, corresponding to said curved inner surface; and
   d. said single core part being adapted to swing with respect to said one of said segments so as to exhibit, during withdrawal of said one, a cross-sectional area with respect to the axis of withdrawal of said one, at least as small as the cross-sectional area of said one.

2. The apparatus of claim 1 further provided with friction means adapted to tend to maintain the relative position of said single core part to said one of said segments.

3. The apparatus of claim 1 wherein at least one of the three pieces comprising said two segments and said core part is provided with a tongue alined with its reciprocation axis and adapted to engage a corresponding groove in at least one of the remaining pieces when in abutting position.

Dedication 3,545,718.—*Kenneth A. Shale*, Garrettsville, Ohio. REMOVABLE MOLD CORE. Patent dated Dec. 8, 1970. Dedication filed Aug. 18, 1971, by the assignee, *Continental Oil Company*.

Hereby dedicates to the Public the entire remaining term of all claims of said patent.

[*Official Gazette October 19, 1971.*]